(12) United States Patent
Zhang

(10) Patent No.: US 10,779,302 B2
(45) Date of Patent: Sep. 15, 2020

(54) METHOD AND DEVICE IN WIRELESS COMMUNICATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/261,583

(22) Filed: Jan. 30, 2019

(65) Prior Publication Data

US 2019/0159221 A1 May 23, 2019

Related U.S. Application Data

(63) Continuation of application No. PCT/CN2017/094639, filed on Jul. 27, 2017.

(30) Foreign Application Priority Data

Aug. 5, 2016 (CN) .......................... 2016 1 0638012

(51) Int. Cl.
*H04W 72/12* (2009.01)
*H04L 5/00* (2006.01)
*H04W 72/04* (2009.01)

(52) U.S. Cl.
CPC ......... *H04W 72/121* (2013.01); *H04L 5/0007* (2013.01); *H04L 5/0037* (2013.01);
(Continued)

(58) Field of Classification Search
CPC ............. H04W 72/121; H04W 72/042; H04W 72/1289; H04W 72/044; H04W 28/04;
(Continued)

(56) References Cited

U.S. PATENT DOCUMENTS 9,661,650 B2 *  5/2017  Montojo ................ H04L 1/1607
10,582,552 B2 *  3/2020  Kim ....................... H04L 5/0053
(Continued)

FOREIGN PATENT DOCUMENTS

CN          104025496 A        9/2014
CN          104468030 A        3/2015
(Continued)

OTHER PUBLICATIONS

ISR received in application No. PCT/CN2017/094639 dated Oct. 25, 2017.

*Primary Examiner* — Hoang-Chuong Q Vu
(74) *Attorney, Agent, or Firm* — Maschoff Brennan

(57) ABSTRACT

The present disclosure provides a method and a device in wireless communication. In one embodiment, the UE first receives a first signaling, then receives a second signaling, and finally receives a first radio signal on target time-frequency resources; wherein the target time-frequency resources comprise time-frequency resources among second time-frequency resources other than first time-frequency resources, and the second signaling is used for determining whether the target time-frequency resources comprise the first time-frequency resources and the second time-frequency resources. The present disclosure makes effective use of the remaining time-frequency resources that transmit control information in a time interval less than 1 millisecond, thus improving resource utilization.

20 Claims, 11 Drawing Sheets

(52) U.S. Cl.
CPC ..... *H04W 72/042* (2013.01); *H04W 72/1289* (2013.01); *H04W 72/044* (2013.01); *Y02D 70/00* (2018.01); *Y02D 70/10* (2018.01); *Y02D 70/12* (2018.01); *Y02D 70/126* (2018.01)

(58) Field of Classification Search
CPC ... H04L 5/0007; H04L 5/0037; H04L 5/0091; H04L 5/0053; Y02D 70/126; Y02D 70/12; Y02D 70/10; Y02D 70/00
See application file for complete search history.

(56) References Cited

U.S. PATENT DOCUMENTS

| | | | |
|---|---|---|---|
| 2015/0271846 A1* | 9/2015 | Kowalski | H04W 72/14 370/329 |
| 2015/0334698 A1* | 11/2015 | Park | H04L 5/0091 455/426.1 |
| 2017/0019886 A1* | 1/2017 | Patel | H04W 4/70 |
| 2017/0303272 A1* | 10/2017 | Li | H04W 4/44 |
| 2017/0367100 A1* | 12/2017 | Sorrentino | H04W 72/1215 |
| 2017/0367110 A1* | 12/2017 | Li | H04W 72/1268 |
| 2018/0020365 A1* | 1/2018 | Xiong | H04W 4/70 |
| 2018/0227943 A1* | 8/2018 | xiao | H04W 76/23 |
| 2018/0242190 A1* | 8/2018 | Khoryaev | H04L 47/283 |
| 2018/0263052 A1* | 9/2018 | Xu | H04W 72/0446 |
| 2019/0028863 A1* | 1/2019 | Kim | H04W 72/10 |
| 2019/0349173 A1* | 11/2019 | Kim | H04W 72/02 |

FOREIGN PATENT DOCUMENTS

| | | |
|---|---|---|
| CN | 105009474 A | 10/2015 |
| WO | 2016053844 A1 | 4/2016 |

\* cited by examiner

METHOD AND DEVICE IN WIRELESS COMMUNICATION

CROSS REFERENCE TO RELATED APPLICATION

This application is a continuation of International Application No. PCT/CN2017/094639, filed Jul. 27, 2017, claiming the priority benefit of Chinese Patent Application Serial Number 201610638012.6, filed on Aug. 5, 2016, the full disclosure of which is incorporated herein by reference.

BACKGROUND

Technical Field

The present application relates to transmission schemes in wireless communication systems, and in particular to a method and a device for low-latency transmission based on Long Term Evolution (LTE).

Related Art

The 3$^{rd}$ Generation Partner Project (3GPP) Radio Access Network (RAN) #63 plenary meeting decided to study the subject of reducing latencies of LTE networks. The latencies of LTE networks include radio latency, signal processing delay, transmission delay between nodes, and the like. With the upgrade of wireless access networks and core networks, transmission delay is effectively reduced. With the application of new semiconductors having higher processing speeds, the signal processing delay is significantly reduced. At the RAN #72 plenary meeting, 3GPP decided to standardize the shortening of Transmission Time Intervals (TTIs) and the signal processing delay based on previous research achievements.

In existing LTE systems, a TTI or a subframe or a Physical Resource Block (PRB) pair corresponds to one milli-second (ms) in time domain. In order to reduce network latencies, 3GPP decided to standardize short TTIs, for example, in LTE Frequency Division Duplexing (FDD) systems, 2-Orthogonal Frequency Division Multiplexing (OFDM) symbol downlink TTI, 1-Timeslot (TS) TTI downlink TTI and 2-OFDM symbol uplink TTI, 4-OFDM symbol uplink TTI and 1-TS uplink TTI are introduced, and in LTE Time Division Duplexing (TDD) systems 1-TS TTI is introduced for both uplink and downlink.

Resource scheduling in LTE is carried out through Downlink Control Information (DCI), and DCI is transmitted through a Physical Downlink Control Channel (PDCCH) or an Enhanced PDCCH (EPDCCH). In order to support short TTIs, 3GPP decided to introduce a downlink control channel transmitted in short TTIs (which is temporarily named short PDCCH (sPDCCH)). The sPDCCH transports uplink and downlink scheduling information or other control information in all or parts of sTTIs.

SUMMARY

In one short TTI, a base station may schedule multiple User Equipments (UEs) simultaneously, however each scheduled UE can learn only time-frequency resources occupied by its own control information, but cannot learn time-frequency resources occupied by control information of other UEs. If downlink data transmissions of all UEs are restricted to particular time-frequency resource areas in a simple manner just to avoid the downlink data transmission of one UE colliding with the time-frequency resources occupied by the control information of other UEs, then in the condition that only a few UEs are scheduled, time-frequency resources in idle control areas still cannot be allocated to the downlink data transmissions of the scheduled UEs. Consequently, resource waste is caused and spectrum efficiency is decreased. Since time-frequency resources of short TTIs are limited, the above problem becomes extremely significant in the case of short TTIs.

In view of the problem that resources in idle control information areas cannot be effectively used, the present disclosure provides a solution. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for low latency, wherein the method includes:
  receiving a first signaling;
  receiving a second signaling; and
  receiving a first radio signal on target time-frequency resources.

Herein, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the first signaling is a high-layer signaling, and the second signaling is a physical-layer signaling.

In one embodiment, the first signaling is a physical-layer signaling, and the second signaling is a physical-layer signaling.

In one embodiment, the first time-frequency resources are used for transmitting at least one of L signaling(s), the L is a positive integer, and the L signaling(s) includes the second signaling.

In one embodiment, the second signaling indicates within the first resource pool the first time-frequency resources.

In one embodiment, the second time-frequency resources and the first time-frequency resources are partially overlapped.

In one embodiment, the second time-frequency resources and the first time-frequency resources are orthogonal (that is, non-overlapped at all).

In one embodiment, the second time-frequency resources include the first time-frequency resources.

In one embodiment, the phrase that the first resource pool is reserved to downlink physical layer signalings refers that: the first resource pool is preferentially occupied by the former one of {the downlink physical layer signalings, downlink physical layer data}.

In one embodiment, the phrase that the first resource pool is reserved to downlink physical layer signalings refers that: the first resource pool can be occupied by the downlink physical layer signalings only.

In one embodiment, the second signaling can dynamically indicate the first time-frequency resources, thereby ensuring that the target time-frequency resources can effectively occupy the remaining of the first time-frequency resources, so as to improve resource utilization and system spectrum efficiency.

In one embodiment, the second signaling is Downlink Control Information (DCI).

In one subembodiment, a UE-specific indication can be realized through a DCI, maximizing the flexibility of indication.

In one embodiment, the second signaling includes a Control Format Indicator (CFI).

In one embodiment, the second signaling is transmitted through a first physical channel, and the first physical channel is used for indicating time-frequency resources occupied by a DCI in the first time interval.

In one embodiment, the second signaling is transmitted in the first time interval.

In one embodiment, the second signaling includes scheduling information of the first radio signal, and the scheduling information includes at least one of {a Resource Allocation (RA), a Modulation and Coding Scheme (MCS), a New Data Indicator (NDI), a Redundancy Version (RV) and a HARQ process number}.

In one embodiment, the target time-frequency resources and the first time-frequency resources are orthogonal, wherein the orthogonal means that there is no time or frequency belonging to both the target time-frequency resources and the first time-frequency resources.

In one embodiment, the target time-frequency resources are consecutive in frequency domain.

In one embodiment, the target time-frequency resources are discrete in frequency domain.

In one embodiment, the target time-frequency resources are consecutive in time domain.

In one embodiment, the target time-frequency resources are discrete in time domain.

In one embodiment, the target time-frequency resources include R subcarriers in frequency domain, wherein the R is a positive integer. In one subembodiment, the R is a multiple of 12. In another subembodiment, any two of the R subcarriers occupy the same number of time-domain OFDM symbols. In another subembodiment, two of the R subcarriers occupy different numbers of time-domain OFDM symbols.

In one subembodiment, when two of the R subcarriers occupy different numbers of time-domain OFDM symbols, the target time-frequency resources have the highest flexibility of allocation.

In one embodiment, the first time-frequency resources are consecutive in frequency domain.

In one embodiment, the first time-frequency resources are discrete in frequency domain.

In one embodiment, the first time-frequency resources are consecutive in time domain.

In one embodiment, the first time-frequency resources are discrete in time domain.

In one embodiment, the first time-frequency resources include H subcarriers in frequency domain, wherein the H is a positive integer. In one subembodiment, the H is a multiple of 12. In another subembodiment, any two of the H subcarriers occupy the same number of time-domain OFDM symbols. In another subembodiment, two of the H subcarriers occupy different numbers of time-domain OFDM symbols.

In one embodiment, the first time-frequency resources belong to the first time interval in time domain.

In one embodiment, time-domain resources of the first time-frequency resources are part of the first time interval.

In one embodiment, the first time interval includes Q consecutive time-domain OFDM symbols, the OFDM symbols include cyclic prefixes, and the R is a positive integer. In one subembodiment, the R is one of {2, 4, 7}.

In one embodiment, time-domain resources of the target time-frequency resources are parts of the first time interval.

In one embodiment, the target time-frequency resources are parts of the second time-frequency resources.

In one embodiment, the target time-frequency resources are the same as the second time-frequency resources.

In one embodiment, the second time-frequency resources are consecutive in frequency domain.

In one embodiment, the second time-frequency resources are discrete in frequency domain.

In one embodiment, the second time-frequency resources are consecutive in time domain.

In one embodiment, the second time-frequency resources are discrete in time domain.

In one embodiment, the second time-frequency resources include J subcarriers in frequency domain, wherein the J is a positive integer. In one subembodiment, the J is a multiple of 12. In another subembodiment, any two of the J subcarriers occupy the same number of time-domain OFDM symbols. In another subembodiment, two of the J subcarriers occupy different numbers of time-domain OFDM symbols.

In one embodiment, a transport channel corresponding to the first radio signal is a Downlink Shared Channel (DL-SCH) mapped within the first time interval.

In one embodiment, the first radio signal is an output after the first bit block is processed sequencially through channel coding, modulation mapper, layer mapper, precoding, resource element mapper, and generation of OFDM signals. In one subembodiment, the first bit block includes one or more Transport Blocks (TBs). In one subembodiment, the first bit block is part of a TB.

In one embodiment, through the configuration of the first resource pool, signaling overheads indicating the first time-frequency resources can be effectively reduced, meanwhile, the flexibility of allocation of the first time-frequency resources is ensured.

In one embodiment, the first signaling is a high-layer signaling.

In one embodiment, the first signaling is a physical-layer signaling.

In one embodiment, the first signaling is a physical-layer signaling, and the first signaling includes scheduling information of the first radio signal, and the scheduling information includes at least one of {an RA, an MCS, an RV, an NDI, a HARQ process number}.

In one embodiment, the first signaling is DCI.

In one embodiment, the first resource pool is consecutive in frequency domain.

In one embodiment, the first resource pool is discrete in frequency domain.

According to one aspect of the present disclosure, the above method is characterized in that: the second signaling indicates whether the target time-frequency resources include the first time-frequency resources, and the first time-frequency resources are common parts of the first resource pool and the second time-frequency resources.

In one embodiment, the target time-frequency resources and the first time-frequency resources are orthogonal, wherein the orthogonal means that there is no time or frequency belonging to both the target time-frequency resources and the first time-frequency resources.

In one embodiment, the target time-frequency resources include the first time-frequency resources.

In one embodiment, the first time-frequency resources are null.

In one embodiment, the first time-frequency resources include at least one Resource Unit (RU). The RU occupies one subcarrier in frequency domain and occupies a duration of one OFDM symbol in time domain.

According to one aspect of the present disclosure, the above method is characterized in that: the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

In one embodiment, the introduction of the P time-frequency patterns can effectively reduce signaling overheads required to indicate the first time-frequency resources.

In one embodiment, the P time-frequency pattern(s) is(are) predefined implicitly.

In one embodiment, the P time-frequency pattern(s) is(are) predefined explicitly.

In one embodiment, the P time-frequency pattern(s) is(are) related to the first resource pool.

In one embodiment, the P time-frequency pattern(s) belongs(belong) to the first resource pool.

In one embodiment, the P time-frequency pattern(s) is(are) configured through the first signaling.

In one embodiment, the P time-frequency pattern(s) is(are) configured through a physical layer signaling.

In one embodiment, the P time-frequency pattern(s) is(are) configured through a Radio Resource Control (RRC) signaling.

In one embodiment, the P time-frequency pattern(s) corresponds(correspond) to P frequency offset(s), and frequency starting point(s) of the P frequency offset(s) is(are) predefined.

According to one aspect of the present disclosure, the above method further includes:
receiving a third signaling.

Herein, the third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

In one embodiment, the third signaling is a high-layer signaling.

In one embodiment, the third signaling is a physical-layer signaling.

In one embodiment, the third signaling is a physical-layer signaling, the third signaling includes scheduling information of the first radio signal, and the scheduling information includes at least one of {an RA, an MCS, an RV, an NDI, a HARQ process number}.

In one embodiment, the third signaling is DCI.

In one embodiment, frequency-domain resources occupied by the first time interval are consecutive in frequency domain.

In one embodiment, frequency-domain resources occupied by the first time interval are discrete in frequency domain.

In one embodiment, frequency-domain resources occupied by the first time interval include W subcarrier(s), wherein the W is a positive integer. In one subembodiment, the W is a multiple of 12.

The present disclosure provides a method in a base station for low latency, wherein the method includes:
transmitting a second signaling;
transmitting a first signaling; and
transmitting a first radio signal on target time-frequency resources.

Herein, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

According to one aspect of the present disclosure, the above method is characterized in that: the second signaling indicates whether the target time-frequency resources include the first time-frequency resources, and the first time-frequency resources are common parts of the first resource pool and the second time-frequency resources.

According to one aspect of the present disclosure, the above method is characterized in that: the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

According to one aspect of the present disclosure, the above method further includes:
transmitting a third signaling.

Herein, the third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

According to one aspect of the present disclosure, the above method further includes:
determining a second bit block.

Herein, the second bit block is generated by the first bit block through channel coding, and the second bit block includes a positive integer number of bit(s).

In one embodiment, the first radio signal is an output after the second bit block is processed sequentially through modulation mapper, layer mapper, precoding, resource element mapper, and generation of OFDM signals.

In one embodiment, the first bit block is channel encoded then rate matched according to the target time-frequency resources to generate the second bit block.

In one subembodiment, through the rate matching, a code rate of the first signal can be flexibly adjusted according to the occupation of the first time-frequency resources.

In one embodiment, the first bit block is channel encoded then punctured according to the target time-frequency resources to generate the second bit block on the target time-frequency resources.

In one subembodiment, through puncturing, the code rate of the first radio signal can be maintained, meanwhile, the transmission of control information in the first time-frequency resource can be ensured.

In one embodiment, the channel coding is Convolution coding.

In one embodiment, the channel coding is Turbo coding.

The present disclosure provides a UE for low latency, wherein the UE includes:

a first receiver, to receive a first signaling;

a second receiver, to receive a second signaling; and a third receiver, to receive a first radio signal on target time-frequency resources.

Herein, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

According to one aspect of the present disclosure, the above UE is characterized in that: the second signaling indicates whether the target time-frequency resources include the first time-frequency resources, and the first time-frequency resources are common parts of the first resource pool and the second time-frequency resources.

According to one aspect of the present disclosure, the above UE is characterized in that: the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

According to one aspect of the present disclosure, the above UE is characterized in that: the first receiver further receives a third signaling; the third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

The present disclosure provides a base station for low latency, wherein the base station includes:

a first transmitter, to transmit a first signaling;

a second transmitter, to transmit a second signaling; and a third transmitter, to transmit a first radio signal on target time-frequency resources.

Herein, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

According to one aspect of the present disclosure, the above base station is characterized in that: the second signaling indicates whether the target time-frequency resources include the first time-frequency resources, and the first time-frequency resources are common parts of the first resource pool and the second time-frequency resources.

According to one aspect of the present disclosure, the above base station is characterized in that: the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

According to one aspect of the present disclosure, the above base station is characterized in that: the first transmitter further transmits a third signaling, the third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

According to one aspect of the present disclosure, the above base station is characterized in that: the third transmitter further determines a second bit block, the second bit block is generated by the first bit block through channel coding, and the second bit block includes a positive integer number of bit(s).

In one embodiment, compared with existing published technologies, the present disclosure has the following technical benefits.

According to time-frequency resources occupied to transmit DCIs in a sTTI, resources that can be used by UEs scheduled in the sTTI to transmit downlink data are indicated through dynamic signalings, which ensures that the transmission of the downlink data makes effective use of the remaining time-frequency resources other than the resources used to transmit DCIs in the sTTI, and improves resource utilization and system spectrum efficiency.

Signaling overheads that are used to indicate time-frequency resources occupied to transmit DCIs in the sTTI are reduced.

Resources to transmit downlink data are flexibly allocated.

BRIEF DESCRIPTION OF THE DRAWINGS

Other features, purposes and advantages of the present application will become more apparent from the detailed description of non-restrictive embodiments taken in conjunction with the following drawings.

DESCRIPTION OF THE EMBODIMENTS

The technical scheme of the present application is described below in further detail in conjunction with the drawings. It should be noted that the embodiments in the application and the characteristics of the embodiments may be arbitrarily combined if there is no conflict.

Embodiment 1

Figure 1:
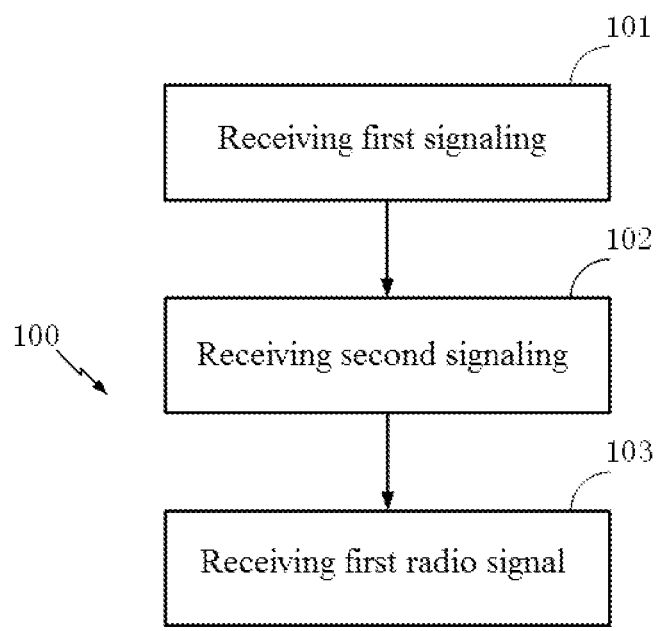
FIG. 1 is a flowchart illustrating transmissions of a first signaling, a second signaling and a first radio signal according to one embodiment of the present application.

Embodiment 1 illustrates an example of a flowchart of transmissions of a first signaling, a second signaling and a first radio signal according to one embodiment of the present disclosure, as shown in FIG. 1. In FIG. 1, each box represents a step. In Embodiment 1, the UE in the present disclosure first receives a first signaling, then receives a second signaling, and finally receives a first radio signal, wherein first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the first signaling is a high-layer signaling, and the second signaling is a physical-layer signaling.

In one embodiment, the first signaling is a physical-layer signaling, and the second signaling is a physical-layer signaling.

In one embodiment, the first time-frequency resources are used for transmitting at least one of L signaling(s), the L is a positive integer, and the L signaling(s) includes(include) the second signaling.

In one embodiment, the second signaling indicates within the first resource pool the first time-frequency resources.

In one embodiment, the second time-frequency resources and the first time-frequency resources are partially overlapped.

In one embodiment, the second time-frequency resources and the first time-frequency resources are orthogonal (that is, non-overlapped at all).

In one embodiment, the second time-frequency resources include the first time-frequency resources.

In one embodiment, the phrase that the first resource pool is reserved to downlink physical layer signalings refers that: the first resource pool is preferentially occupied by the former one of {the downlink physical layer signalings, downlink physical layer data}.

In one embodiment, the phrase that the first resource pool is reserved to downlink physical layer signalings refers that: the first resource pool can be occupied by the downlink physical layer signalings only.

In one embodiment, the second signaling can dynamically indicate the first time-frequency resources, thereby ensuring that the target time-frequency resources can effectively occupy the remaining of the first time-frequency resources, so as to improve resource utilization and system spectrum efficiency.

In one embodiment, the second signaling is DCI.

In one subembodiment, a UE-specific indication can be realized through the DCI, maximizing the flexibility of indication.

In one embodiment, the second signaling includes CFI.

In one embodiment, the second signaling is transmitted through a first physical channel, and the first physical channel is used for indicating time-frequency resources occupied by DCI in the first time interval.

In one embodiment, the second signaling is transmitted in the first time interval.

In one embodiment, the second signaling includes scheduling information of the first radio signal, and the scheduling information includes at least one of {an RA, an MCS, an NDI, an RV and a HARQ process number}.

In one embodiment, the target time-frequency resources and the first time-frequency resources are orthogonal, wherein the orthogonal means that there is no time or frequency belonging to both the target time-frequency resources and the first time-frequency resources.

In one embodiment, the target time-frequency resources are consecutive in frequency domain.

In one embodiment, the target time-frequency resources are discrete in frequency domain.

In one embodiment, the target time-frequency resources are consecutive in time domain.

In one embodiment, the target time-frequency resources are discrete in time domain.

In one embodiment, the target time-frequency resources include R subcarrier(s) in frequency domain, wherein the R is a positive integer. In one subembodiment, the R is a multiple of 12. In another subembodiment, any two of the R subcarriers occupy the same number of time-domain OFDM symbols. In another subembodiment, two of the R subcarriers occupy different numbers of time-domain OFDM symbols.

In one affiliated embodiment of the above embodiment, when two of the R subcarriers occupy different numbers of time-domain OFDM symbols, the target time-frequency resources have the highest flexibility of allocation.

In one embodiment, the first time-frequency resources are consecutive in frequency domain.

In one embodiment, the first time-frequency resources are discrete in frequency domain.

In one embodiment, the first time-frequency resources are consecutive in time domain.

In one embodiment, the first time-frequency resources are discrete in time domain.

In one embodiment, the first time-frequency resources include H subcarriers in frequency domain, wherein the H is a positive integer. In one subembodiment, the H is a multiple of 12. In another subembodiment, any two of the H subcarriers occupy the same number of time-domain OFDM symbols. In another subembodiment, two of the H subcarriers occupy different numbers of time-domain OFDM symbols.

In one embodiment, the first time-frequency resources belong to the first time interval in time domain.

In one embodiment, time-domain resources of the first time-frequency resources are parts of the first time interval.

In one embodiment, the first time interval includes Q consecutive time-domain OFDM symbols, the OFDM symbols include cyclic prefixes, and the R is a positive integer. In one subembodiment, the R is one of {2, 4, 7}.

In one embodiment, time-domain resources of the target time-frequency resources are parts of the first time interval.

In one embodiment, the target time-frequency resources are parts of the second time-frequency resources.

In one embodiment, the target time-frequency resources are the same as the second time-frequency resources.

In one embodiment, the second time-frequency resources are consecutive in frequency domain.

In one embodiment, the second time-frequency resources are discrete in frequency domain.

In one embodiment, the second time-frequency resources are consecutive in time domain.

In one embodiment, the second time-frequency resources are discrete in time domain.

In one embodiment, the second time-frequency resources include J subcarrier(s) in frequency domain, wherein the J is a positive integer. In one subembodiment, the J is a multiple of 12. In another subembodiment, any two of the J subcarriers occupy the same number of time-domain OFDM symbols. In another subembodiment, two of the J subcarriers occupy different numbers of time-domain OFDM symbols.

In one embodiment, a transport channel corresponding to the first radio signal is a DL-SCH mapped within the first time interval.

In one embodiment, the first radio signal is an output after the first bit block is processed sequentially through channel coding, modulation mapper, layer mapper, precoding, resource element mapper, and generation of OFDM signals. In one subembodiment, the first bit block includes one or more TBs. In one subembodiment, the first bit block is part of a TB.

In one embodiment, through the configuration of the first resource pool, signaling overheads indicating the first time-frequency resources can be effectively reduced, meanwhile, the flexibility of allocation of the first time-frequency resources is ensured.

In one embodiment, the first signaling is a high-layer signaling.

In one embodiment, the first signaling is a physical-layer signaling.

In one embodiment, the first signaling is a physical-layer signaling, and the first signaling includes scheduling information of the first radio signal, and the scheduling information includes at least one of {an RA, an MCS, an RV, an NDI, a HARQ process number}.

In one embodiment, the first signaling is DCI.

In one embodiment, the first resource pool is consecutive in frequency domain.

In one embodiment, the first resource pool is discrete in frequency domain.

Embodiment 2

Figure 2:
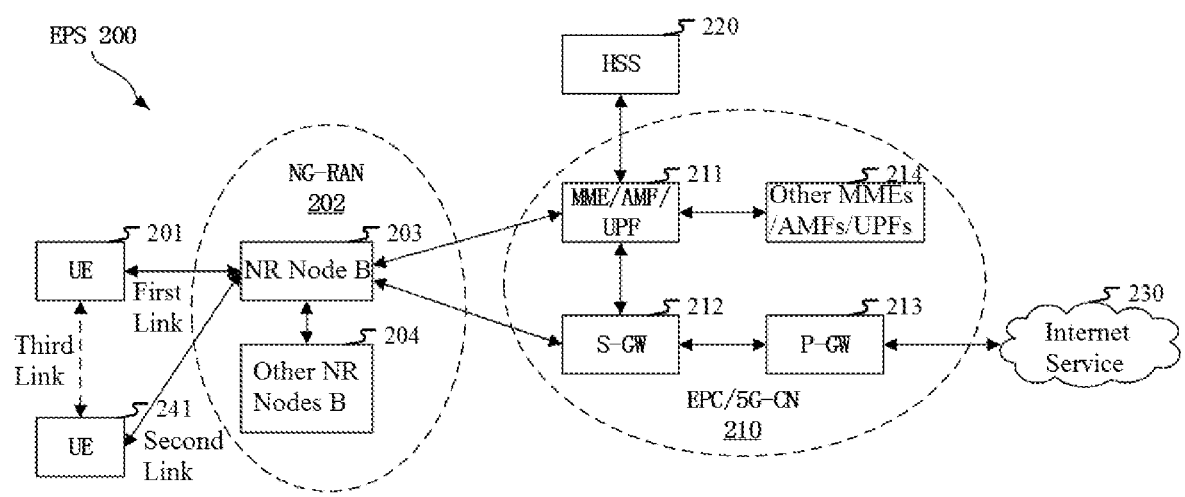
FIG. 2 is a diagram illustrating a network architecture according to one embodiment of the present application.

Embodiment 2 illustrates an example of a diagram for a network architecture, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the present application can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the present application.

In one embodiment, the gNB 203 corresponds to the base station in the present application.

In one embodiment, the UE 201 supports dynamic resource sharing of a PDCCH and a PDSCH.

In one embodiment, the gNB 203 supports dynamic resource sharing of a PDCCH and a PDSCH.

Embodiment 3

Figure 3:
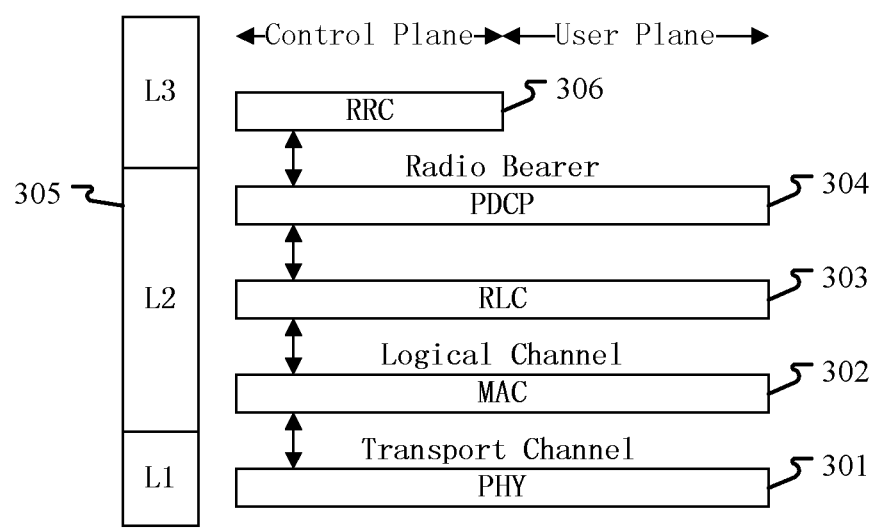
FIG. 3 is a diagram illustrating a radio protocol architecture of a user plane and a control plane according to one embodiment of the present application.

Embodiment 3 is a diagram illustrating an embodiment of a radio protocol architecture of a user plane and a control plane according to the present application, as shown in FIG. 3. FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at the P-GW 213 of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by HARQ. The MAC sublayer 302 provides multiplexing between logical channels and transport channels. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one embodiment, the radio protocol architecture shown in FIG. 3 is applicable to the UE in the present application.

In one embodiment, the radio protocol architecture shown in FIG. 3 is applicable to the base station in the present application.

In one embodiment, the first signaling in the present application is generated by the RRC 306.

In one embodiment, the first signaling in the present application is generated by the PHY 301.

In one embodiment, the first radio signal in the present application is generated by the PHY 301.

In one embodiment, the second signaling in the present application is generated by the PHY 301.

In one embodiment, the third signaling in the present application is generated by the RRC 306.

In one embodiment, the third signaling in the present application is generated by the PHY 301.

Embodiment 4

Figure 4:
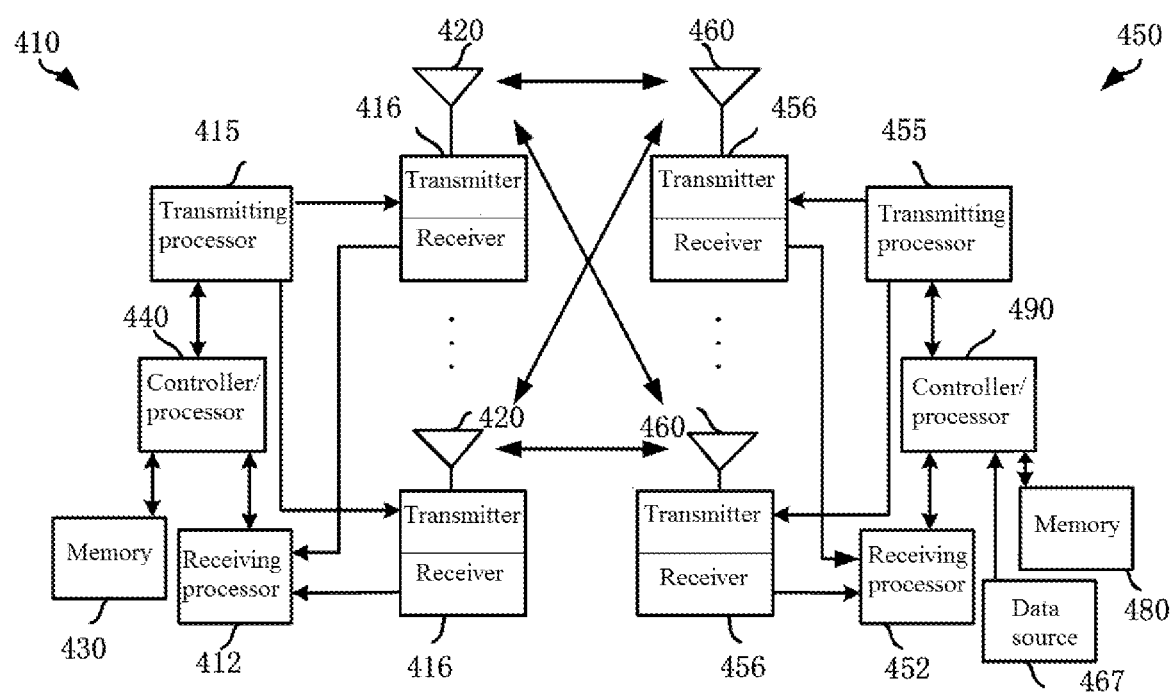
FIG. 4 is a diagram illustrating a base station and a given UE according to one embodiment of the present application.

Embodiment 4 illustrates a diagram of a base station and a given UE according to the present application, as shown in FIG. 4. FIG. 4 is a block diagram of a gNB 410 in communication with a UE 450 in an access network.

The UE 450 includes a controller/processor 490, a memory 480, a receiving processor 452, a transmitter/receiver 456, a transmitting processor 455, and a data source 467. The transmitter/receiver 456 includes an antenna 460. The data source 467 provides higher-layer packet(s) to the controller/processor 490. The controller/processor 490 provides header compression/decompression, encryption/decryption, packet segmentation and reordering, multiplexing/de-multiplexing between a logical channel and a transport channel, to implement L2 protocols used for the user plane and the control plane. The higher-layer packet(s) may include data or control information, for example, DL-SCH or UL-SCH. The transmitting processor 455 performs signal transmitting processing functions of L1 layer (that is, PHY), including encoding, interleaving, scrambling, modulation, power control/allocation, precoding, generation of physical layer control signaling(s), etc. The receiving processor 452 performs signal receiving processing functions of L1 layer (that is, PHY), including decoding, de-interleaving, descrambling, demodulation, decoding, extraction of physical layer control signaling, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

The base station 410 may include a controller/processor 440, a memory 430, a receiving processor 412, a transmitter/receiver 416 and a transmitting processor 415. The transmitter/receiver 416 includes an antenna 420. Higher-layer packet(s) is(are) provided to the controller/processor 440. The controller/processor 440 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 415 performs signal transmitting processing functions of L1 layer (that is, PHY), including encoding, interleaving, scrambling, modulation, power control/allocation, precoding, generation of physical layer control signaling(s) (including PBCH, PDCCH, PHICH, PCFICH, reference signal), etc. The first signaling in the present disclosure may be generated through the transmitting processor 415 or a high-layer signaling provided to the controller/processor 440. The second signaling in the present disclosure is generated through the transmitting processor 415. The third signaling in the present disclosure may be generated through the transmitting processor 415 or a high-layer signaling provided to the controller/processor 440. The receiving processor 412 performs signal receiving processing functions of L1 layer (that is, PHY), including decoding, de-interleaving, descrambling, demodulation, decoding, extraction of physical layer control signaling(s), etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

In Downlink (DL) transmission, a higher-layer packet DL-SCH is provided to the controller/processor 440. The controller/processor 440 performs functions of L2 layer. In downlink transmission, the controller/processor 440 provides header compression, encryption, packet segmentation and reordering, multiplexing between a logical channel and a transport channel, and radio resource allocation for the UE 450 based on various priorities. The controller/processor 440 is also in charge of HARQ operation, retransmission of a lost packet, and signalings to the UE 450 (the first signaling and the third signaling in the present disclosure). The transmitting processor 415 performs signal processing functions of L1 layer (that is, PHY). The signal processing function includes coding and interleaving, so as to ensure an FEC (Forward Error Correction) and a demodulation of baseband signals corresponding to different modulation schemes (i.e., BPSK, QPSK, etc.) at the UE 450 side. The modulated symbols are divided into parallel streams. Each of the parallel streams is mapped to corresponding subcarriers of multi-carriers and/or multi-carrier symbols. Then the transmitting processor 415 maps the parallel streams into the antenna 420 via the transmitter 416 so as to transmit the parallel streams in the form of Radio Frequency (RF) signals to form the first radio signal in the present disclosure. At the receiving side, every receiver 456 receives a radio frequency signal via the corresponding antenna 460. Every receiver 456 recovers the baseband information modulated to the RF carrier and provides the baseband information to the receiving processor 452. The receiving processor 452 performs signal receiving processing functions of L1 layer. The signal receiving processing functions include receiving the first radio signal on target time-frequency resources determined in the present disclosure, then conducting demodulation corresponding to different modulation schemes (i.e., BPSK, QPSK, etc.) in multi-carrier symbols in multi-carrier symbol streams on the target time-frequency resources, then decoding and de-interleaving to recover the data or control signal transmitted by the gNB 410 on the physical channel, and then providing the data and control signal to the controller/processor 490. The controller/processor 490 performs functions of L2 layer. The controller/processor may be connected to a memory 480 that stores program codes and data. The memory 480 may be called a computer readable medium.

In one embodiment, the UE 450 device includes at least one processor and at least one memory. The at least one memory includes computer program codes. The at least one memory and the computer program codes are configured to be used in collaboration with the at least one processor. The UE 450 device at least receives a first signaling, receives a second signaling, and receives a first radio signal on target time-frequency resources; wherein first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the UE 450 includes a memory that stores a computer readable instruction program. The computer readable instruction program generates an action when executed by at least one processor. The action includes receiving a first signaling, receiving a second signaling, and receiving a first radio signal on target time-frequency resources; wherein first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the gNB 410 includes at least one processor and at least one memory. The at least one memory includes computer program codes. The at least one memory and the computer program codes are configured to be used in collaboration with the at least one processor. The gNB 410 at least transmits a first signaling, transmits a second signaling, and transmits a first radio signal on target time-frequency resources; wherein first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the gNB 410 includes a memory that stores a computer readable instruction program. The computer readable instruction program generates an action when executed by at least one processor. The action includes transmitting a first signaling, transmitting a second signaling, and transmitting a first radio signal on target time-frequency resources; wherein first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s).

In one embodiment, the UE 450 corresponds to the UE in the present disclosure.

In one embodiment, the gNB 410 corresponds to the base station in the present disclosure.

In one embodiment, at least the former two of the receiver 456 (including the antenna 450), the receiving processor 452 and the controller/processor 490 are used for receiving the first signaling in the present disclosure.

In one embodiment, the receiver 456 (including the antenna 460) and the receiving processor 452 are used for receiving the second signaling in the present disclosure.

In one embodiment, at least the former two of the receiver 456 (including the antenna 450), the receiving processor 452 and the controller/processor 490 are used for receiving the third signaling in the present disclosure.

In one embodiment, the receiver 456, the receiving processor 452 and the controller/processor 490 are used for receiving the first radio signal in the present disclosure.

In one embodiment, at least the former two of the transmitter 416 (including the antenna 420), the transmitting processor 415 and the controller/processor 440 are used for transmitting the first signaling in the present disclosure.

In one embodiment, the transmitter 416 (including the antenna 420) and the transmitting processor 415 are used for transmitting the second signaling in the present disclosure.

In one embodiment, at least the former two of the transmitter 416 (including the antenna 420), the transmitting processor 415 and the controller/processor 440 are used for transmitting the third signaling in the present disclosure.

In one embodiment, the transmitter 416 (including the antenna 420), the transmitting processor 415 and the controller/processor 440 are used for transmitting the first radio signal in the present disclosure.

Embodiment 5

Figure 5:
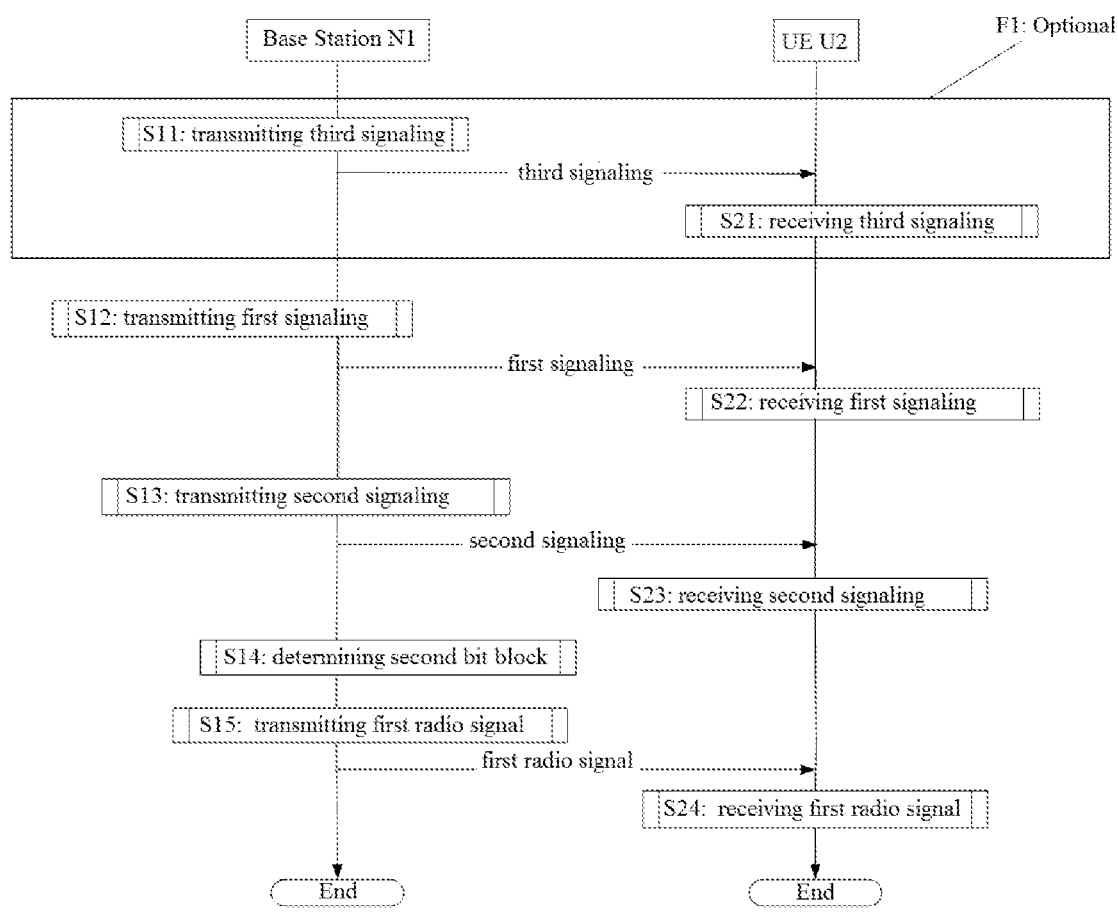
FIG. 5 is a flowchart illustrating a downlink transmission of a radio signal according to one embodiment of the present application.

Embodiment 5 illustrates an example of a flowchart for downlink transmissions of radio signals, as shown in FIG. 5. In FIG. 5, a base station N1 is a maintenance base station for a serving cell of a UE U2. Steps marked box F1 are optional.

The base station N1 transmits a third signaling in S11, transmits a first signaling in S12, transmits a second signaling in S13, determines a second bit block in S14, and transmits a first radio signal in S15.

The UE U2 receives a third signaling in S21, receive a first signaling in S22, receives a second signaling in S23, and receives a first radio signal in S24.

In Embodiment 5, the first radio signal occupies target time-frequency resources, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, and the first bit block includes a positive integer number of bit(s); the first signaling is used for determining a first resource pool, the first resource pool includes the first time-frequency resources, and the first resource pool is reserved to downlink physical layer signaling(s); The third signaling is used for determining frequency-domain resources occupied by the first time interval; The second bit block is generated by the first bit block through channel coding, and the second bit block includes a positive integer number of bit(s).

In one embodiment, the second signaling is transmitted through DCI.

In one embodiment, the first signaling is transmitted through RRC.

In one embodiment, the third signaling is transmitted through DCI.

In one embodiment, a transport channel corresponding to the first radio signal is a DL-SCH mapped at the target time interval.

In one embodiment, the first radio signal is an output after the first bit block is processed sequentially through channel coding, modulation mapper, layer mapper, precoding, resource element mapper, and generation of OFDM signals. In one subembodiment, the first bit block includes one or more TBs. In one subembodiment, the first bit block is part of a TB.

In one embodiment, the first bit block is channel encoded then rate matched according to the target time-frequency resources to generate a second bit block.

In one embodiment, the first bit block is channel encoded then punctured according to the target time-frequency resources to generate a second bit block.

Embodiment 6

Figure 6:
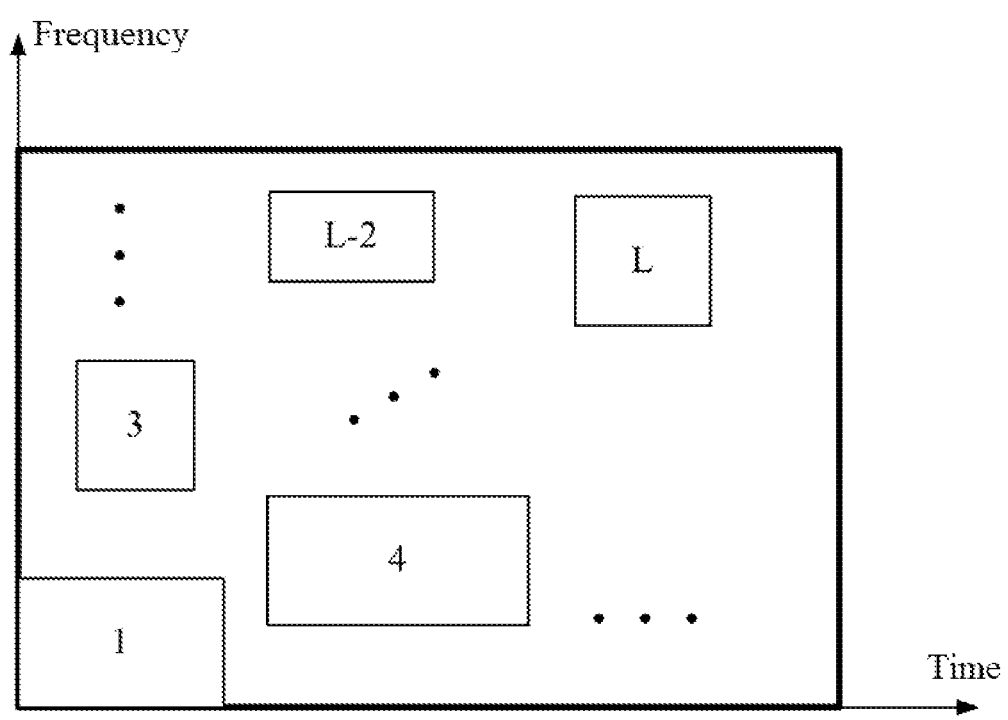
FIG. 6 is a diagram illustrating first time-frequency resources according to one embodiment of the present application.

Embodiment 6 illustrates an example of a diagram of first time-frequency resources, as shown in FIG. 6. In FIG. 6, the horizontal axis represents time and the vertical axis represents frequency, the maximum rectangular area represents first time-frequency resources, the first time-frequency resources are used to transmit at least one of L signalings, rectangles marked by numbers represent respectively time-frequency resources occupied by signalings among the L signalings that are contained in the first time-frequency resources, the L is a positive integer, and the second signaling is one of the L signalings.

In one embodiment, the time-frequency resources occupied by the L signalings are of the same size.

In one embodiment, the time-frequency resources occupied by two signalings among the L signalings are different.

In one embodiment, the L signalings are transmitted through DCI.

In one embodiment, the first time-frequency resources include time-frequency resources occupied by the second signaling.

In one embodiment, the first time-frequency resources include time-frequency resources among the time-frequency resources occupied by the L signalings other than the time-frequency resources occupied by the second signaling.

Embodiment 7

Figure 7:
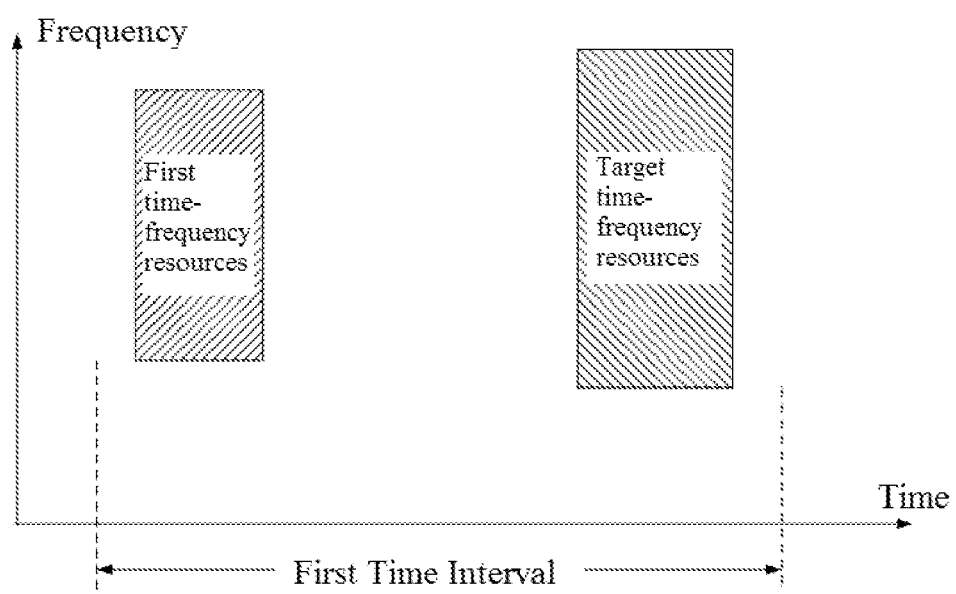
FIG. 7 is a diagram illustrating a relationship between target time-frequency resources and first time-frequency resources according to one embodiment of the present application.

Embodiment 7 illustrates an example of a diagram of a relationship between target time-frequency resources and first time-frequency resources, as shown in FIG. 7. In FIG. 7, inner boxes represent the first time-frequency resources and the target time-frequency resources respectively. A first time interval has a duration less than 1 millisecond.

In Embodiment 7, the first time-frequency resources and the target time-frequency resources are orthogonal, wherein the orthogonal means that there is no RU belonging to both the target time-frequency resources and the first time-frequency resources. The RU occupies one subcarrier in frequency domain and occupies a duration of one OFDM symbol in time domain.

In one embodiment, the first time-frequency resources belong to the first time interval in time domain.

In one embodiment, time-domain resources of the first time-frequency resources are parts of the first time interval.

In one embodiment, the target time-frequency resources belong to the first time interval in time domain.

In one embodiment, time-domain resources of the target time-frequency resources are parts of the first time interval.

Embodiment 8

Figure 8:
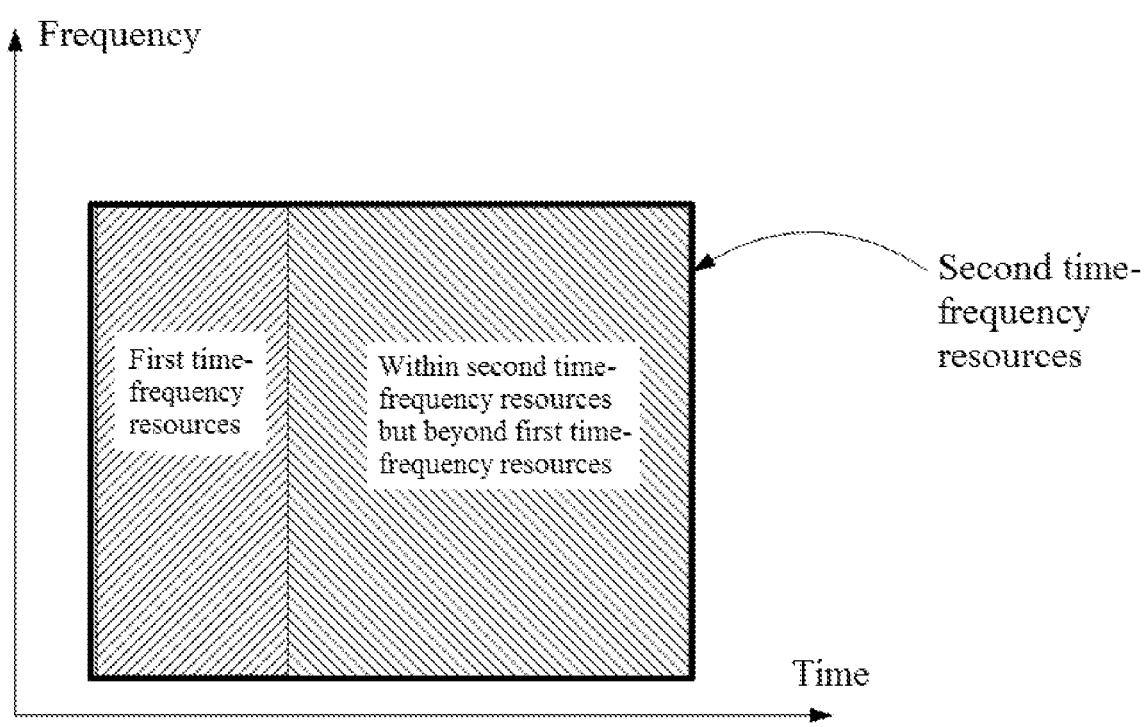
FIG. 8 is a diagram illustrating target time-frequency resources and second time-frequency resources according to one embodiment of the present application.

Embodiment 8 illustrates an example of a diagram of a relationship between target time-frequency resources and second time-frequency resources, as shown in FIG. 8. In FIG. 8, a box filled by right slashes represents the target time-frequency resources, and a box having a heavy line frame represents the second time-frequency resources.

In one embodiment, the target time-frequency resources are time-frequency resources among the second time-frequency resources other than the first time-frequency resources.

In one embodiment, the target time-frequency resources are the same as the second time-frequency resources.

In one embodiment, the second time-frequency resources include J subcarriers in frequency domain, wherein the J is a positive integer. In one subembodiment, the J is a multiple of 12. In another subembodiment, any two of the J subcarriers occupy the same number of time-domain OFDM symbols. In another subembodiment, two of the J subcarriers occupy different numbers of time-domain OFDM symbols.

In one embodiment, the first signaling includes scheduling information of the first radio signal, and the scheduling information includes at least one of {an RA, an MCS, an NDI, an RV, a HARQ process number}. The second time-frequency resources are indicated by the RA.

Embodiment 9

Figure 9:
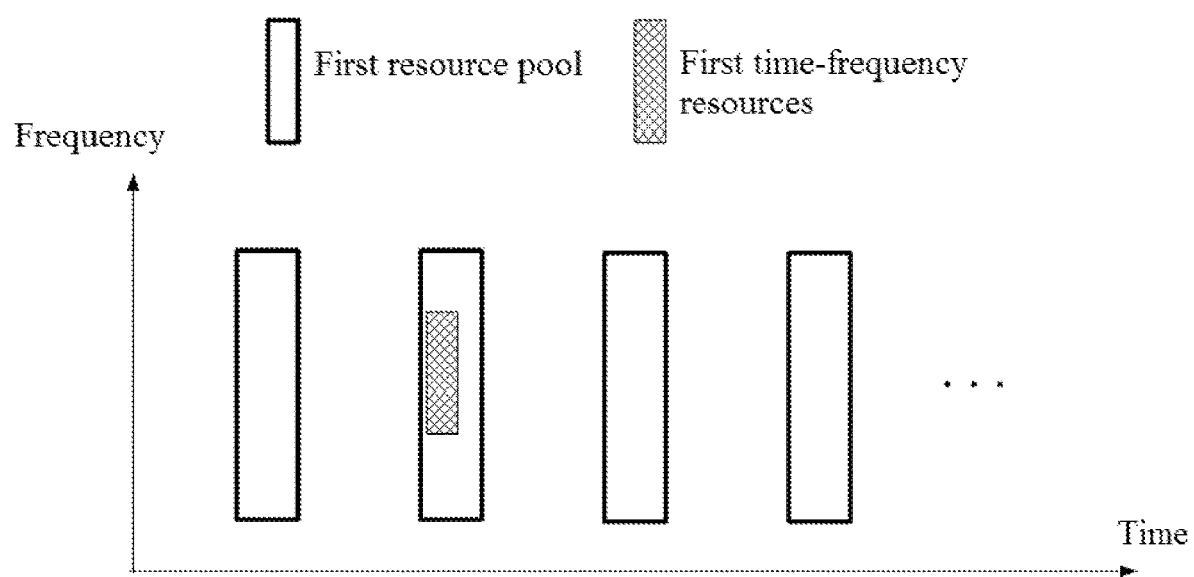
FIG. 9 is a diagram illustrating a relationship between a first resource pool and first time-frequency resources according to one embodiment of the present application.

Embodiment 9 illustrates an example of a diagram of a relationship between a first resource pool and first time-frequency resources, as shown in FIG. 9. In FIG. 9, fine-line grids correspond to the first time-frequency resources, rectangles having heavy line frames correspond to the first resource pool, the first resource pool includes the first time-frequency resources, and the first resource pool is indicated by a first signaling. The first resource pool is discrete in time domain.

In one embodiment, the first resource pool is consecutive in frequency domain.

In one embodiment, the first resource pool is discrete in frequency domain.

In one embodiment, the first signaling is an RRC signaling.

Embodiment 10

Figure 10:
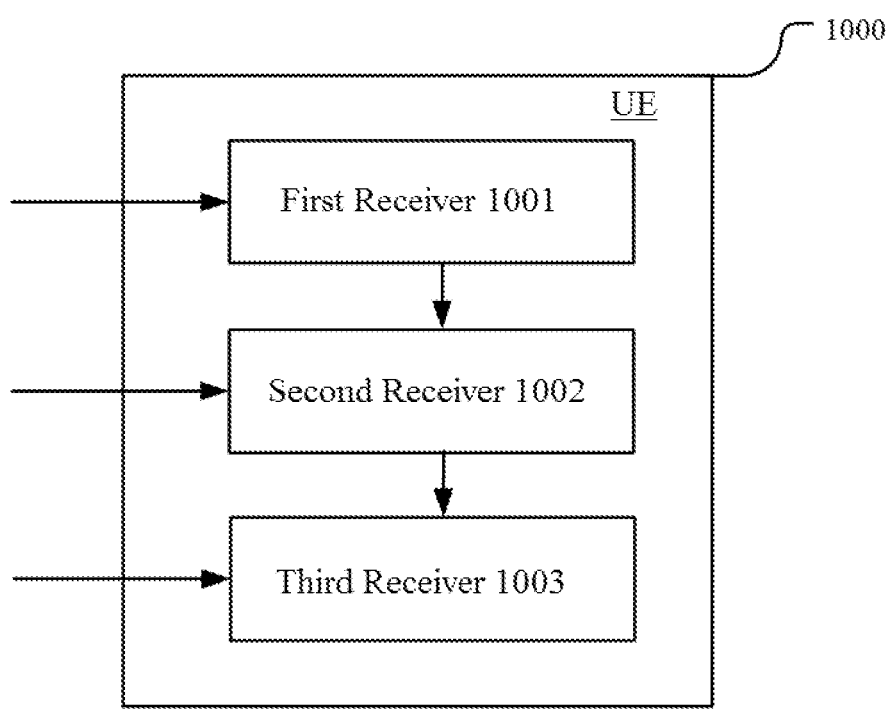
FIG. 10 is a structure block diagram illustrating a processing device in a UE according to one embodiment of the present application.

Embodiment 10 illustrates an example of a structure block diagram of a processing device in a UE, as shown in FIG. 10. In FIG. 10, the processing device 1000 in the UE includes a first receiver 1001, a second receiver 1002 and a third receiver 1003. The first receiver 1001 includes the receiver 456 (including the antenna 460), the receiving processor 452 and the controller/processor 490 shown in the FIG. 4 of the present disclosure; the second receiver 1002 includes the receiver 456 (including the antenna 460) and the receiving processor 452 shown in the FIG. 4 of the present disclosure; and the third receiver 1003 includes the receiver 456 (including the antenna 460), the receiving processor 452 and the controller/processor 490 shown in the FIG. 4 of the present disclosure.

The first receiver 1001 receives a first signaling and a third signaling; the second receiver 1002 receives a second signaling; and the third receiver 1003 receives a first radio signal on target time-frequency resources.

In Embodiment 10, first time-frequency resources and the target time-frequency resources are orthogonal, or the target time-frequency resources include the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block includes a positive integer number of bit(s), and the first bit block is transmitted on the target time-frequency resources; the first signaling is used for determining a first resource pool, the first resource pool includes the first time-frequency resources, and the first resource pool is reserved to downlink physical layer signaling(s); The third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

In one embodiment, the second signaling indicates whether the target time-frequency resources include the first time-frequency resources, and the first time-frequency resources are common parts of the first resource pool and the second time-frequency resources.

In one embodiment, the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

In one embodiment, the second signaling is transmitted through DCI, the first signaling received by the second receiver 1001 is transmitted through RRC, and the third signaling is transmitted through DCI.

In one embodiment, the first radio signal is an output after the first bit block is processed sequentially through channel coding, modulation mapper, layer mapper, precoding, resource element mapper, and generation of OFDM signals. In one subembodiment, the first bit block includes one or more TBs.

Embodiment 11

Figure 11:
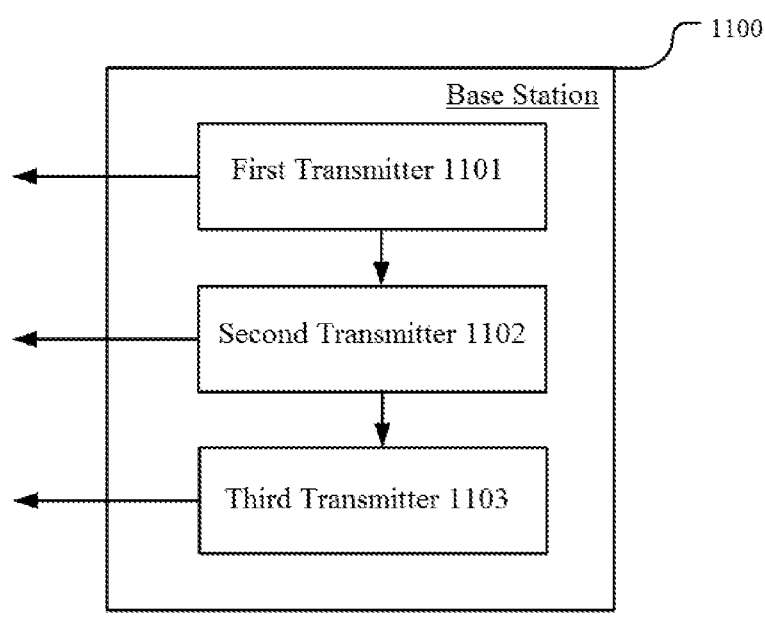
FIG. 11 is a structure block diagram illustrating a processing device in a base station according to one embodiment of the present application.

Embodiment 11 illustrates an example of a structure block diagram of a processing device in a base station, as shown in FIG. 11. In FIG. 11, the processing device 1100 in the base station includes a first transmitter 1101, a second transmitter 1102 and a third transmitter 1103. The first transmitter 1101 includes the transmitter 416 (including the antenna 420), the transmitting processor 415 and the controller/processor 440 shown in the FIG. 4 of the present disclosure. The second transmitter 1102 includes the transmitter 416 (including the antenna 420) and the transmitting processor 415 shown in the FIG. 4 of the present disclosure. The third transmitter 1103 includes the transmitter 416 (including the antenna 420), the transmitting processor 415 and the controller/processor 440 shown in the FIG. 4 of the present disclosure.

The first transmitter 1101 transmits a first signaling; the second transmitter 1102 transmits a second signaling; and the third transmitter 1103 transmits a first radio signal on target time-frequency resources.

In Embodiment 11, the target time-frequency resources include time-frequency resources among the second time-frequency resources other than the first time-frequency resources, the second signaling indicates {whether the target time-frequency resources include the first time-frequency resources, the second time-frequency resources}, the first time-frequency resources are common parts of the first resource pool and the second time-frequency resources; The target time-frequency resources belong to a first time interval in time domain, and the first time interval has a duration less than 1 millisecond. The first radio signal carries a first bit block, the first bit block includes a positive integer number of bit(s), and the first bit block is transmitted on the target time-frequency resources; The first signaling is used for determining a first resource pool, and the first resource pool includes the first time-frequency resources; The first resource pool is reserved to downlink physical layer signaling(s).

In one embodiment, the second signaling indicates whether the target time-frequency resources include the first time-frequency resources, and the first time-frequency resources are common part of the first resource pool and the second time-frequency resources.

In one embodiment, the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

In one embodiment, the third transmitter 1103 further determines a second bit block, the second bit block is generated by the first bit block through channel coding, and the second bit block includes a positive integer number of bit(s).

In one affiliated embodiment of the above embodiment, the second bit block is generated on the target time-frequency resources by the first bit block through channel coding and rate matching.

In another affiliated embodiment of the above embodiment, the second bit block is generated on the target time-frequency resources by the first bit block through channel coding and puncturing.

In one embodiment, the first transmitter 1101 further transmits a third signaling, and the third signaling is used for determining frequency-domain resources that can be occupied in the first time interval; and {the target time-frequency resources, the first time-frequency resources, and the second time-frequency resources} all belong to the frequency-domain resources that can be occupied in the first time interval.

In one embodiment, the second signaling is DCI, the first signaling is an RRC signaling, and the third signaling is DCI.

In one embodiment, the first radio signal is an output after the first bit block is processed sequentially through channel coding, modulation mapper, layer mapper, precoding, resource element mapper, and generation of OFDM signals. In one subembodiment, the first bit block includes one or more TBs.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE or terminal in the present application includes but not limited to mobile phones, tablet computers, notebooks, network cards, low-power equipment, vehicle-mounted communication equipment and other wireless communication equipment. The base station or network side equipment in the present application includes but not limited to macro-cellular base stations, micro-cellular base stations, home base stations, relay base station and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A method in a User Equipment (UE) for low latency, comprising:
   receiving a first signaling;
   receiving a second signaling; and
   receiving a first radio signal on target time-frequency resources;
   wherein first time-frequency resources and the target time-frequency resources are orthogonal, or the target time-frequency resources comprise the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block comprises a positive integer number of bit(s), and the first bit block is transmitted on the target time-frequency resources; the first signaling is used for determining a first resource pool, the first resource pool comprises the first time-frequency resources, and the first resource pool is reserved to downlink physical layer signaling(s); the second signaling includes scheduling information of the first radio signal, and the scheduling information includes at least one of a Resource Allocation (RA), a Modulation and Coding Scheme (MCS), a New Data Indicator (NDI), a Redundancy Version (RV) and a HARQ process number.

2. The method according to claim 1, wherein the second signaling indicates whether the target time-frequency resources comprise the first time-frequency resources, and the first time-frequency resources are common parts of the first resource pool and the second time-frequency resources.

3. The method according to claim 1, wherein the first time-frequency resources comprise H subcarriers in frequency domain, the H is a positive integer, and the H is a multiple of 12.

4. The method according to claim 1, wherein the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

5. The method according to claim 1, further comprising:
   receiving a third signaling;
   wherein the third signaling is used for determining frequency-domain resources that can be occupied in the first time interval; and the target time-frequency resources, the first time-frequency resources, and the second time-frequency resources all belong to the frequency-domain resources that can be occupied in the first time interval.

6. A method in a base station for low latency, comprising:
   transmitting a second signaling;
   transmitting a first signaling; and
   transmitting a first radio signal on target time-frequency resources;
   wherein first time-frequency resources and the target time-frequency resources are orthogonal, or the target time-frequency resources comprise the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block comprises a positive integer number of bit(s), and the first bit block is transmitted on the target time-frequency resources; the first signaling is used for determining a first resource pool, the first resource pool comprises the first time-frequency resources, and the first resource pool is reserved to downlink physical layer signaling(s); the second signaling includes scheduling information of the first radio signal, and the scheduling information includes at least one of a Resource Allocation (RA), a Modulation and Coding Scheme (MCS), a New Data Indicator (NDI), a Redundancy Version (RV) and a HARQ process number.

7. The method according to claim 6, wherein the second signaling indicates whether the target time-frequency resources comprise the first time-frequency resources, and the first time-frequency resources are common parts of the first resource pool and the second time-frequency resources.

8. The method according to claim 6, wherein the first time-frequency resources comprise H subcarriers in frequency domain, the H is a positive integer, and the H is a multiple of 12.

9. The method according to claim 6, wherein the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

10. The method according to claim 6, further comprising:
    determining a second bit block;
    wherein the first bit block is channel encoded then rate matched according to the target time-frequency resources to generate the second bit block, and the second bit block comprises a positive integer number of bit(s).

11. A UE for low latency, comprising:
    a first receiver, to receive a first signaling;
    a second receiver, to receive a second signaling; and
    a third receiver, to receive a first radio signal on target time-frequency resources;
    wherein first time-frequency resources and the target time-frequency resources are orthogonal, or the target time-frequency resources comprise the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block comprises a positive integer number of bit(s), and the first bit block is transmitted on the target time-frequency resources; the first signaling is used for determining a first resource pool, the first resource pool comprises the first time-frequency resources, and the first resource pool is reserved to downlink physical layer signaling(s); the second signaling includes scheduling information of the first radio signal, and the scheduling information includes at least one of a Resource Allocation (RA), a Modulation and Coding Scheme (MCS), a New Data Indicator (NDI), a Redundancy Version (RV) and a HARQ process number.

12. The UE according to claim 11, wherein the second signaling indicates whether the target time-frequency resources comprise the first time-frequency resources, and the first time-frequency resources are common parts of the first resource pool and the second time-frequency resources.

13. The UE according to claim 11, wherein the first time-frequency resources comprise H subcarriers in frequency domain, the H is a positive integer, and the H is a multiple of 12.

14. The UE according to claim 11, wherein the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

15. The UE according to claim 11, wherein the first receiver further receives a third signaling; the third signaling is used for determining frequency-domain resources that can be occupied in the first time interval; and the target time-frequency resources, the first time-frequency resources, and the second time-frequency resources all belong to the frequency-domain resources that can be occupied in the first time interval.

16. A base station for low latency, comprising:
a first transmitter, to transmit a first signaling;
a second transmitter, to transmit a second signaling; and
a third transmitter, to transmit a first radio signal on target time-frequency resources;
wherein first time-frequency resources and the target time-frequency resources are orthogonal, or the target time-frequency resources comprise the first time-frequency resources; time-frequency resources among second time-frequency resources other than the first time-frequency resources belong to the target time-frequency resources, and the second signaling is used for determining the first time-frequency resources and the second time-frequency resources; the target time-frequency resources belong to a first time interval in time domain, and the first time interval has a duration less than 1 millisecond; the first radio signal carries a first bit block, the first bit block comprises a positive integer number of bit(s), and the first bit block is transmitted on the target time-frequency resources; the first signaling is used for determining a first resource pool, the first resource pool comprises the first time-frequency resources, and the first resource pool is reserved to downlink physical layer signaling(s); the second signaling includes scheduling information of the first radio signal, and the scheduling information includes at least one of a Resource Allocation (RA), a Modulation and Coding Scheme (MCS), a New Data Indicator (NDI), a Redundancy Version (RV) and a HARQ process number.

17. The base station according to claim 16, wherein the second signaling indicates whether the target time-frequency resources comprise the first time-frequency resources, and the first time-frequency resources are common parts of the first resource pool and the second time-frequency resources.

18. The base station according to claim 16, wherein the first time-frequency resources comprise H subcarriers in frequency domain, the H is a positive integer, and the H is a multiple of 12.

19. The base station according to claim 16, wherein the second signaling is used for determining a first time-frequency pattern from P time-frequency pattern(s), the P is a positive integer, the first time-frequency pattern is a time-frequency location distribution of the first time-frequency resources in the first resource pool; and the P time-frequency pattern(s) is(are) predefined, or the P time-frequency pattern(s) is(are) configurable.

20. The base station according to claim 16, wherein the third transmitter further determines a second bit block; the first bit block is channel encoded then rate matched according to the target time-frequency resources to generate the second bit block, and the second bit block comprises a positive integer number of bit(s).

* * * * *